(12) United States Patent
Marcjan

(10) Patent No.: US 7,343,378 B2
(45) Date of Patent: Mar. 11, 2008

(54) GENERATION OF MEANINGFUL NAMES IN FLATTENED HIERARCHICAL STRUCTURES

(75) Inventor: Cezary Marcjan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 540 days.

(21) Appl. No.: 10/811,653

(22) Filed: Mar. 29, 2004

(65) Prior Publication Data

US 2005/0216430 A1 Sep. 29, 2005

(51) Int. Cl.
*G06F 17/00* (2006.01)

(52) U.S. Cl. .............. 707/101; 707/102; 707/103 R; 707/104.1

(58) Field of Classification Search .......... 707/1–10, 707/100–104.1, 200–206
See application file for complete search history.

(56) References Cited

U.S. PATENT DOCUMENTS

| | | | |
|---|---|---|---|
| 6,230,157 B1 | 5/2001 | Malcolm et al. | |
| 6,377,945 B1 * | 4/2002 | Risvik | 707/3 |
| 6,415,283 B1 * | 7/2002 | Conklin | 707/3 |
| 6,505,197 B1 | 1/2003 | Sundaresan et al. | |
| 6,748,395 B1 | 6/2004 | Picker et al. | |
| 7,162,480 B2 * | 1/2007 | Vishik | 707/101 |
| 2001/0049675 A1 | 12/2001 | Mandler et al. | |
| 2002/0097278 A1 | 7/2002 | Mandler et al. | |

OTHER PUBLICATIONS

European Search Report dated Oct. 28, 2005 mailed Nov. 8, 2005 for European Patent Application Serial No. 05102341.4-2210 PCT, 2 pages.
D.K. Gifford et al., Semantic Pile Systems, Proceedings of the Symposium on Operating Systems Principles, Pacific Grove, CA, Oct. 13-16, 1991, pp. 16-25, New York, US.
Erhard Rahm, et al., A survey of approaches to automatic schema matching, The VLDB Journal, 2001, pp. 334-350, vol. 10.
Nicolas Anquetil, et al., Extracting Concepts from File Names; a New File Clustering Criterion, Proceedings of the 20th international conference on Software engineering, 1998, pp. 84-93, Kyoto, Japan.
Jeffrey K. Hollingsworth, et al., Using Content-Derived Names for Configuration Management, SSR '97, 1997, pp. 104-109, Massachusetts, USA.

* cited by examiner

*Primary Examiner*—Isaac Woo
(74) *Attorney, Agent, or Firm*—Amin, Turocy & Calvin, LLP

(57) ABSTRACT

Architecture for generating meaningful names for a flattened data structure. The architecture comprises a system that observes user activity associated with a hierarchical data structure, and then generates meaningful names derived from file and folder names or other character string data that are easier to navigate and understand by the user. The system includes a valuation component that facilitates applying the valuation metrics to each node of the data structure. A selection component selects the one or more nodes for the naming process. A naming component receives and processes the selected node information from the selection component and generates the name(s) for the one or more nodes for the given user. An output of the naming component is the flattened representation in the form of a meaningful name(s) for the data structure.

35 Claims, 8 Drawing Sheets

GENERATION OF MEANINGFUL NAMES IN FLATTENED HIERARCHICAL STRUCTURES

TECHNICAL FIELD

This invention is related to data storage structures, and more specifically, to a mechanism for representing such data structures in a more meaningful way.

BACKGROUND OF THE INVENTION

Existing network file shares utilize hierarchical storage mechanisms represented by nested folders and files which creates a problem with navigation. The organization of the shares content is heterogeneous between different shares, as well as between individuals who manage subsections of the same shares. Given this inconsistency, intimate familiarity with the share is often needed for efficient navigation. To compound the issue, folder naming conventions often vary with the various people using a share. While shares are useful as archives, the side effect is that a person looking for something more currently relevant often has to wade through massive number of files and folders.

New navigation methods for computer network shares utilize collected data on share activity in order to present a more meaningful view of the shared spaces like showing more recent files or more relevant files that are associated with specific persons (opened or created by them recently). Even with this type of improvement navigation in the shared space is hard even when project names are known. There are often large numbers of files placed in complex folder structures with subsections maintained by a number of people who use various naming conventions for folder hierarchies and files.

What is needed is an improved mechanism for viewing such hierarchical structures using naming that is meaningful.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a system that observes user activity associated with a hierarchical data structure, and then generates meaningful names derived from file and folder names or other character string data that are easier to navigate and understand by the user. This invention simplifies browsing of such spaces by creating project views based on collected share activity data. Generally, a database can have different types of hierarchies based further on different fields. A folder in a directory structure is a representation of a project. There can be additional fields, for example, a file that specifies the project, an image that represents the project, or some other data more specific to the project. By looking at these filed, the meaningful naming process can be made smarter. Some subdirectories can be a collection of files within the project, and not the project as a separate entity, which can then be used to generate the meaningful name(s). Metadata of any form can be used to facilitate name generation. Many types of metrics can be employed, including but not limited to, recency, reoccurrence (which is the number of users that come back to the same data location), and classification types (associated with a time period of occurrence where two items are opened and/or edited at the same time). Flat views generated as a result of complex queries provide an important means for quickly understanding and navigating data structures in, for example, operating systems. These views can result from querying rich databases that are a part of the operating systems.

In support thereof, the system includes a valuation component that facilitates applying the valuation metrics to each node of the data structure. The valuation process can be performed in response to a number of predetermined conditions. The system also includes a selection component that selects the one or more nodes for the naming process. A naming component receives and processes the selected node information from the selection component and generates the name(s) for the one or more nodes for the given user. An output of the naming component is the flattened representation in the form of a meaningful name(s) for the data structure. This output can simply be tabular listing of the meaningful names generated from the various nodes. The user is provided with a more intuitive view of such shared space without the need for an intimate knowledge of the structure, thereby allowing the user to quickly review and select the name or name strings to navigate to the desired data location. A component for monitoring the activity on a given share is used for collection of usage data. In one implementation, activity data is used in the process of flattening of the complex hierarchical structure, as well as in generation of meaningful names in the flattened space.

In another aspect of the present invention, artificial intelligence is provided to automate and learn form various user activities. Moreover, automation can be based on data types, and other predetermined user-defined metrics, as well as learned metrics.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
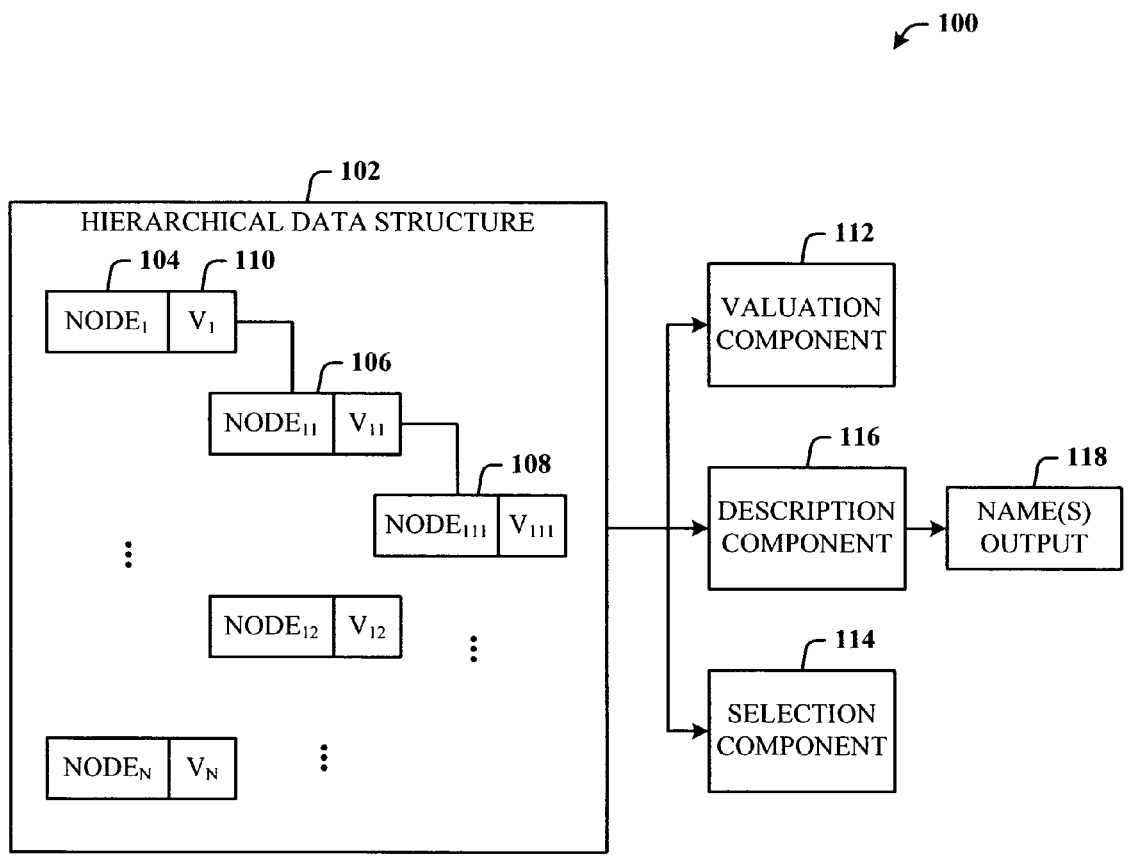
FIG. 1 illustrates a naming system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a naming system 100 in accordance with the present invention. There is provided a partial sample of a conventional hierarchical data structure 102 that is to be flattened and named in accordance with the present invention. The structure 102 includes a plurality of parent nodes denoted $NODE_1, \ldots, NODE_N$, each of which can have one or more child nodes branching therefrom, although this is not required. For purposes of this general description, the first patent node 104 has a first child node 106 (also denoted $NODE_{11}$), which first child node 106 is also a parent node to a second child node 108 (also denoted $NODE_{111}$).

Each node of the structure 102 is assigned a valuation indicia 110 (denoted as $V_1$ for the first parent node 104, and as $V_{11}, V_{111}, \ldots$ for child nodes of one possible path of the first parent node 104) that provides some indication of importance of that node for use in ultimately arriving at the naming for the path to that node. Such valuation indicia are derived in accordance with a number of different predetermined criteria. For example, the criteria can include the time that the node was created, the time accessed, the time modified, the time in which a copy process was performed for data associated with that node, the frequency in which that node is accessed, the number of unique users, and the type of data associated with that node, to name a few. In any case, once the valuation is determined and assigned to the node, node selection can occur in preparation for generating the meaningful names.

In support thereof, the system 100 includes a valuation component 112 that facilitates applying the valuation indicia 110 to each node of the data structure 102. The valuation process can be performed in response to a number of predetermined conditions. For example, in the context of a client computer where the data structure resides only on the client computer, the valuation process can be performed after startup of the computer, or in response to user interaction therewith. Alternatively, the valuations can be from a previous session, the update of which occurs in accordance with manual initiation by the user. Where the data structure 102 encompasses remote data nodes, the valuation process can be performed automatically in response to a user login process or the network. In any case, the valuation process is performed at some point in time and according to triggering events, whether manually or automatically generated. As indicated previously, a number the criteria can be employed to arrive at the valuations for each node, which criteria can be employed using the valuation component 112.

The system 100 also includes a selection component 114 that selects the one or more nodes for the naming process. A description component 116 receives and processes the selected node information from the selection component 114 and generates a description for the one or more nodes for the given user. An output 118 of the description component 116 is the flattened representation in the form of a meaningful description for the data structure 102. This output 118 can simply be tabular listing of descriptions generated from the various nodes, each or any of which can then be hyperlinked for easy navigation to the corresponding data node. The user can then quickly review and select the description or description strings to quickly navigate to the desired data location. It is to be appreciated by one skilled in the art that the valuation component 112, selection component 114, and description component 116 can be combined into a single component that performs all respective functions.

Figure 2:
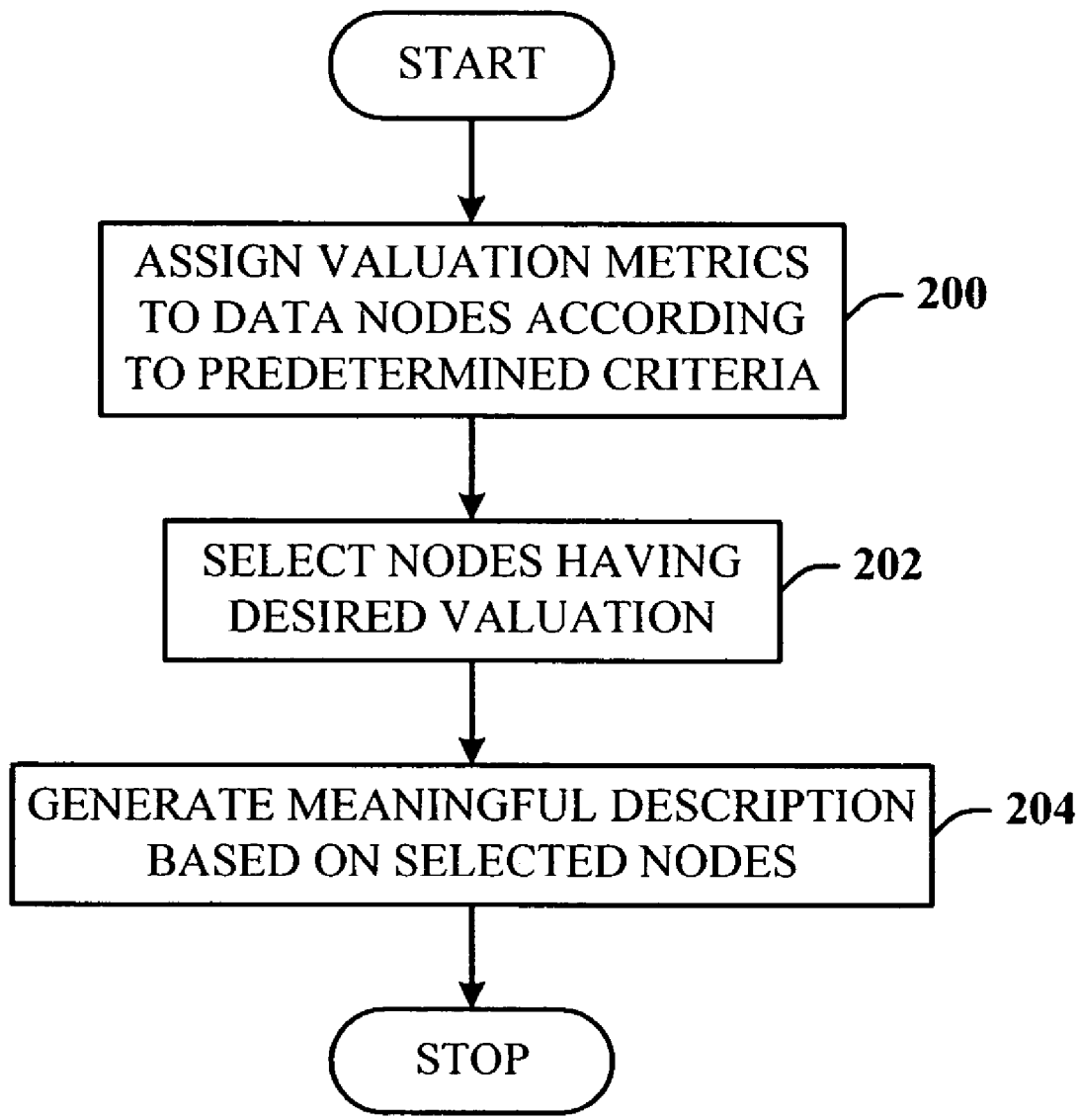
FIG. 2 illustrates a flow chart of a valuation process of the present invention.

Referring now to FIG. 2, there is illustrated a flow chart of a valuation process of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, valuation metrics are determined and assigned to each node of the data hierarchy. Such criteria can include time of creation, time accessed, time modified, whether the data has been modified, time copied, frequency of access, frequency of modification, number of unique users, type of data associated with the node, weighting factors of the node, and time of day, for example. At 202, nodes are selected according to desired valuation data. At 204, data of the selected nodes is used to generate meaningful description for presentation to the user. The process then reaches a Stop block.

Figure 3:
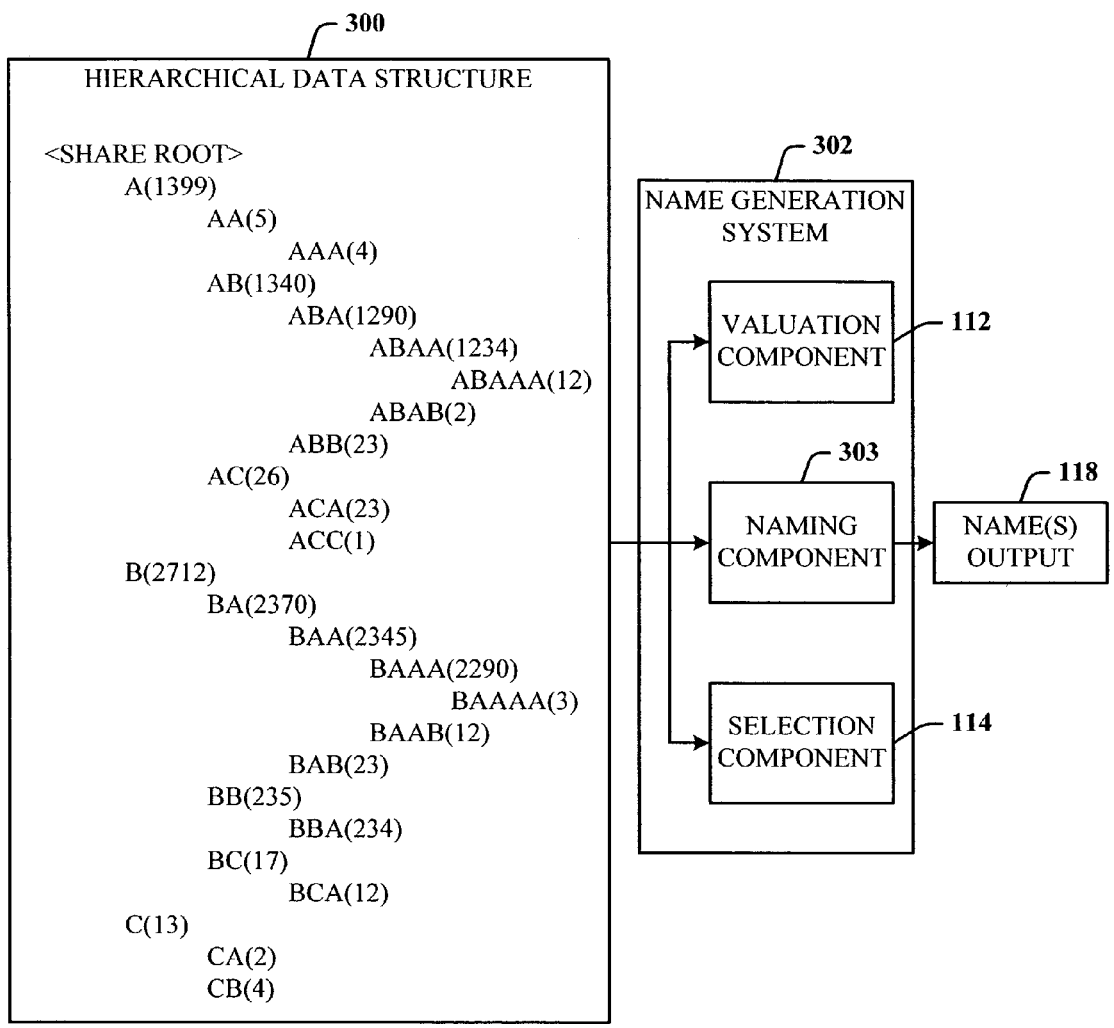
FIG. 3 illustrates a naming process of the present invention for a more specific example of a hierarchical file structure.

Referring now to FIG. 3, there is illustrated a naming process of the present invention for a more specific example of a hierarchical file structure 300. The invention provides an efficient method for flattening hierarchical structures and presenting simplified one-dimensional views (e.g., in the form of a list, play list, . . . ) based on observed user activity. The example of FIG. 3, is described in the context of using network file shares. Computer file systems are becoming more database driven giving the software designer greater flexibility in organizing metadata embedded in file systems. A system that observes activity in a hierarchical structure is used to derive names of a flattened easier to navigate and understand by the user structure.

FIG. 3 illustrates a simplified view of a hierarchical network file share structure 300 with values of some selected measure (e.g., based on recency and access frequency). A name generation system 302 monitors user activity on the given share structure 300 that is used for collection of usage data. The system 302 includes the valuation component 112, the selection component 114 (described previously with respect to FIG. 1), and a naming component 303. Some nodes in the structure 300 can be used for archival purposes, while other nodes can be used for recent up-to-date activities. The system 302 provides the user with a more meaningful view of such shared space without the need for an intimate knowledge of the data structure. Activity data is used in the process of flattening the complex hierarchical structure, as well as, for the generation of meaningful names in the flattened space.

In the illustration of FIG. 3, valuation data (in parenthesis) is generated and associated with each node of the structure 300. For example, at the first level from the root node, an A node has generated and associated therewith a valuation of 1399. Note that the use of capital letters for nodes in this example is for the purpose of describing the general operation of the present invention. In reality, however, the letters would be replaced with user-defined names at each node, as will become apparent at the output of the system 302. However, it is to be appreciated that a user can name such nodes (i.e., folders, subfolders, etc.) as letters, as in the example, and for which meaningful names can still be generated as a flattened output. It may simply be that the meaningful names generated for the flattened structures are meaningful only to that user. That is, the output is a string of letters that can have meaning to a given user, even if not in the form of a word or words. As will be described herein, this can also mean that the naming system 302 can be used to generate a flattened structure with different meaningful names for different users from the same data structure 300.

Continuing with FIG. 3, as can be seen, the highest valuations of the A node are associated with a path defined along A-AB-ABA-ABAA, which have the respective valuations of 1399, 1340, 1290, and 1234. Thus, the flattened output for this representation is A-ABAA. Similarly, for a B node, the highest valuations define a path along B-BA-BAA-BAAA which have the respective valuations of 2712, 2370, 2345, and 2290. The flattened output for this representation is B-BAAA. Thus, for this small structure 300, the flattened output is a listing of A-ABAA and B-BAAA.

The letter strings in the above example were generated by joining highly valued nodes that exceed certain threshold values. In actuality, the names could be further converted to something more meaningful, such as Chicago-Design Specifications or Company-Legal-Justice Dept., the selection of either of which would immediately route the user to that location. Thus, the naming component 116 generates the names that ultimately will be used for the meaningful representation.

As indicated previously, the meaningful names for the same data structure 300 can be generated according to the wishes of the user. A first user can choose to represent the structure 300 as A-ABAA and B-BAAA, as this can be meaningful to the first user, however cryptic it may seem. Yet a second user "looking" at the same structure 300, with the same nodes designated by the same letters, can choose to have the flattened output 118 represented in a different way. That is, the second user can choose to have the system 302 generate textual descriptors to each of the nodes, resulting in output naming in the form similar to Chicago-Design Specifications or Company-Legal-Justice Dept., as this would be more meaningful to the second user. A third user looking at the same data structure could request a naming output that is more meaningful to them in the form of a combination of alphanumeric strings (or Unicode characters and/or images) and words, for example. Thus, the present invention is not limited to outputting meaningful names only as words, but can employ any method that is meaningful to the user.

In support thereof, the naming system 302 provides the capability to extract words for the lettered nodes illustrated in FIG. 3, for the second user that desires to view the flattened output as words, instead of character strings. For example, the system 302 can explore the data in the folder associated with a given single or multiple letter node, and extract a word (or words) that is used more frequently than others (excluding articles, pronouns, etc.), and employ that word to describe that node. Alternatively, the system can select a number of the more frequently used words that are present in the folder, and present those words to the second user for selection of one or two thereof by the second user for describing that node. The system 302 can then further generate the flattened output 118 based upon those user-selected words.

Figure 4:
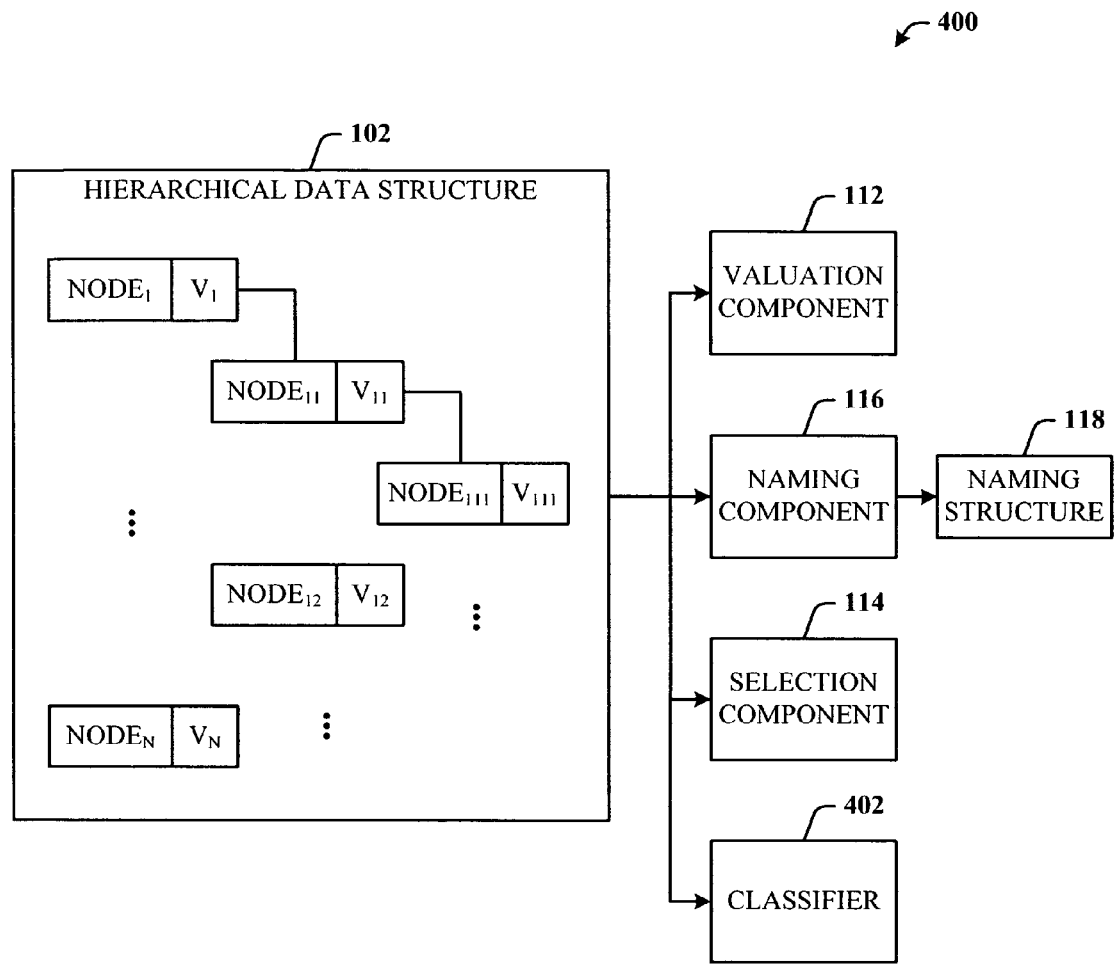
FIG. 4 illustrates a naming system that employs artificial intelligence in accordance with the present invention.

Referring now to FIG. 4, there is illustrated a naming system 400 that employs artificial intelligence in accordance with the present invention. The subject invention (e.g., in connection with selection and name generation) can employ various artificial intelligence based schemes for carrying out various aspects of the subject invention. For example, a process for determining what type of meaningful naming scheme to be used can be facilitated via an automatic classifier system and process 402. Moreover, where the data structure 102 is not totally local the user's computer, but is data that is distributed over several locations, the classifier 402 can be employed to determine which naming scheme to employ based on predominate data type in the structure 102, for example.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to the following: determining according to a predetermined criteria how to assign valuations to the nodes; what metrics to include when making the valuations; whether to employ a weighting scheme in generating a valuation for a node; employ a particular valuation scheme based upon the user; what character strings or text to employ to generate the name output; ignoring generally learned unimportant terms and characters (e.g., articles, pronouns, and strings); determining from a number of terms at a node, which single word (or character or image) or combination of words (or characters or images) to use; where font or character colorations can be employed, what color or combination of colors in a single or combination of characters and/or words can be used for representations to the user; what sounds can be linked to the meaningful name terms to characters, and so on.

Figure 5:
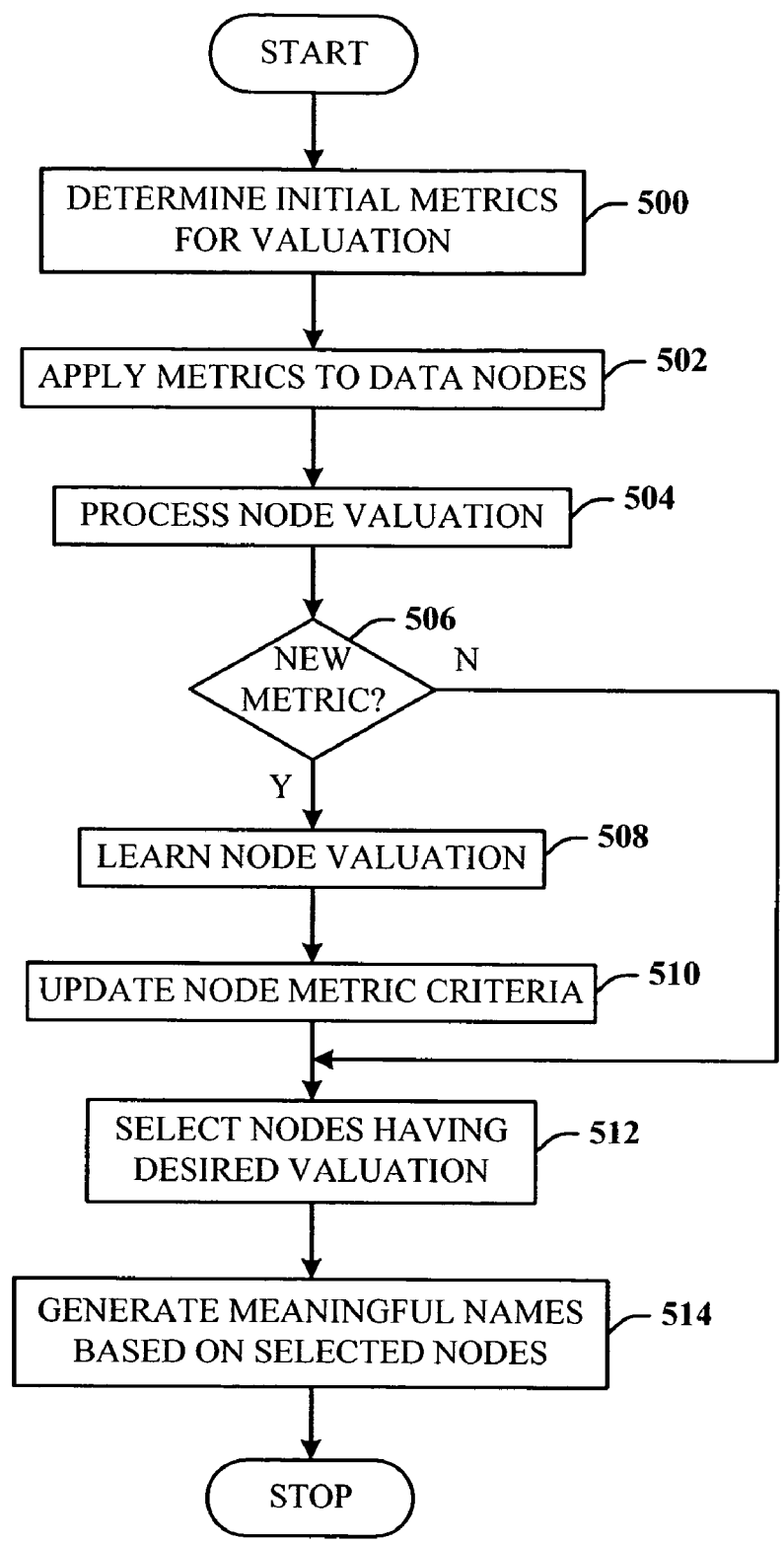
FIG. 5 illustrates a flow chart of a process of learning metric information using artificial intelligence in accordance with the present invention.

Referring now to FIG. 5, there is illustrated a flow chart of a process of learning metric information using artificial intelligence in accordance with the present invention. At 500, the user determines an initial set of metrics that will be used for determining the valuation at any given node. At 502, the metrics are applied to the many nodes of the data structure to arrive at the node valuations at 504. At 506, the system determines if a new metric has can be employed in accordance with measurements. If Yes, at 508, the system learns the observed valuation metric. At 510, the system updates the existing set of valuation criteria accordingly. This can include an "aging out" process that removes one or more criteria from the set of valuation metrics that no longer are observed, over a predetermined period of time, for example. Alternatively, the update process includes adding one or more criterion to the existing set of criteria to further enhance the meaningful naming process. At 512, the nodes having the desired valuation are selected. At 514, a meaningful name (or combination of words) is then generated for the node or node path. The process then reaches a Stop block.

If the system does not observe a new metric, flow is from 506 to 512 to select the node having the desired valuation, and then process accordingly to arrive at the meaningful name.

It is to be appreciated by one skilled in the art that the valuation need not be of a highest value, but can be those nodes having valuations that are within a range—that is, an upper range, a mid range, or even a lower range. For example, the user may desire that the meaningful names be generated for the portion of the data structure where the least activity has been observed (low range of valuations), or where moderate activity has been observed (in the mid range of valuations).

Figure 6:
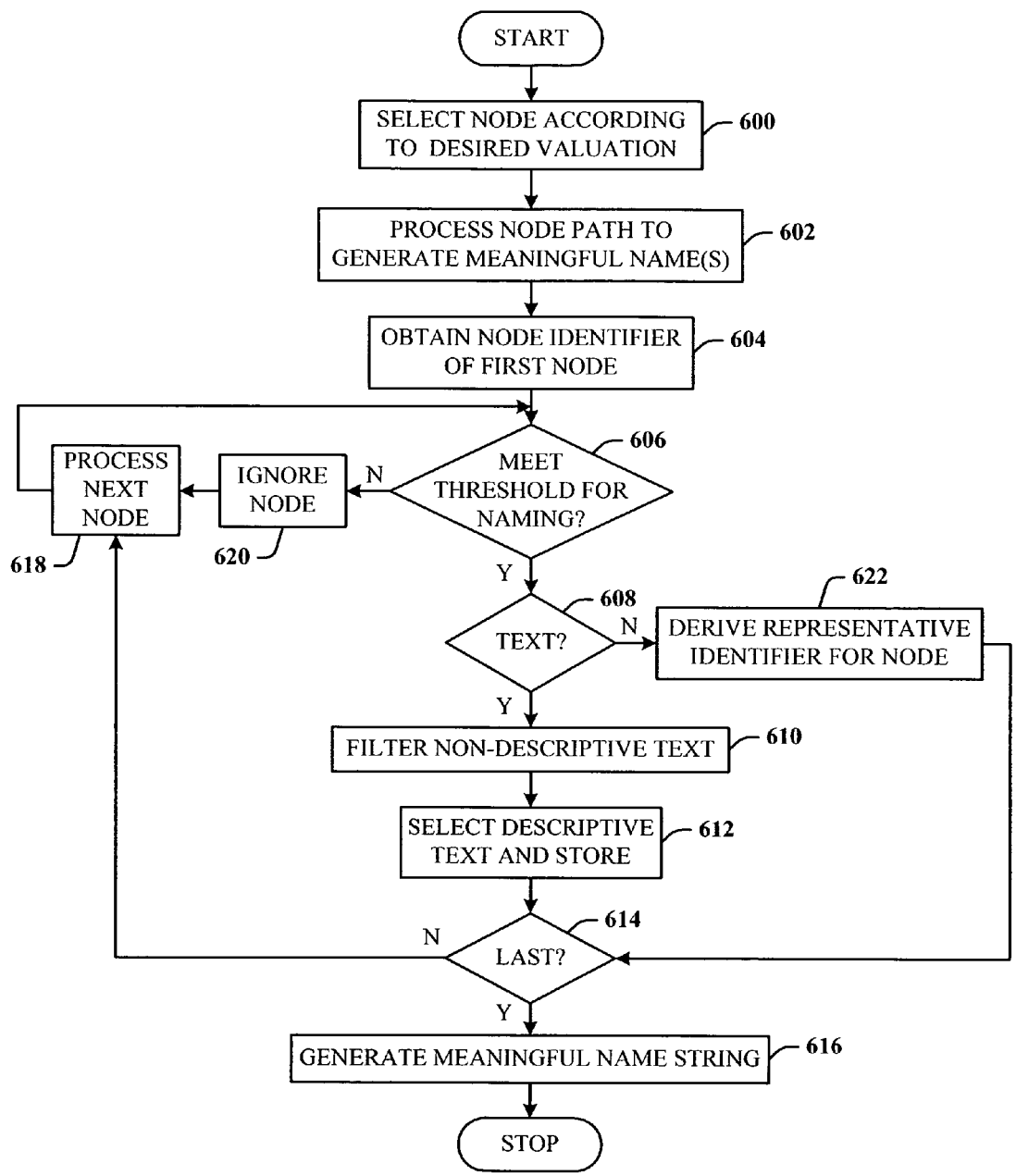
FIG. 6 illustrates a flow chart of a process of generating a meaningful name in accordance with the present invention.

Referring now to FIG. 6, there is illustrated a flow chart of a process of generating a meaningful name in accordance with the present invention. At 600, a node is selected for name processing. This can include a single high-level node, or a child node whose path information has associated therewith numerous terms that need to be processed to generate the resulting meaningful names. At 602, the system operates to begin processing the path information. At 604, the node identifier data is obtained from the first node. At 606, it is determined whether the node valuation meets the threshold for naming. If Yes, at 608, it is determined whether the node identifier data is word text or a character string. If text, flow is to 610 where a filter is employed to filter out unimportant text such as articles, or pronouns, etc. However, note that the level of filtering and types of text filtered can be adjusted to include or exclude any words the user desires. This feature infers the use of a dictionary of words against which the system can test the node identifier data. This dictionary can be automatically updated according to resulting meaningful name information, as performed by the classifier. At 612, descriptive text is selected for that node. This can include a single word or a combination of words. At 614, it is determined if this is the last node to be processed. If Yes, flow is to 616, where the meaningful name is generated and output. The process then reaches a Stop block.

If this is not the last node to be processed, flow is from 614 to 618 to process the next node. Flow is then back to 606 to determine if the next node meets the threshold. If the node does not meet the threshold for naming, flow is from 606 to 620 to ignore that node. At 618, the next node is processed, and flow proceeds accordingly.

If it is determined that the node identifier data (or descriptor data) is not text, but character strings or perhaps image or audio data, flow is from 608 to 622 to derive representative identifier strings, audio, and/or image data for that node. At 614, again, it is determined if this is the last node. If Yes, the meaningful name can be generated using any of the associated string data, audio and/or image data.

Figure 7:
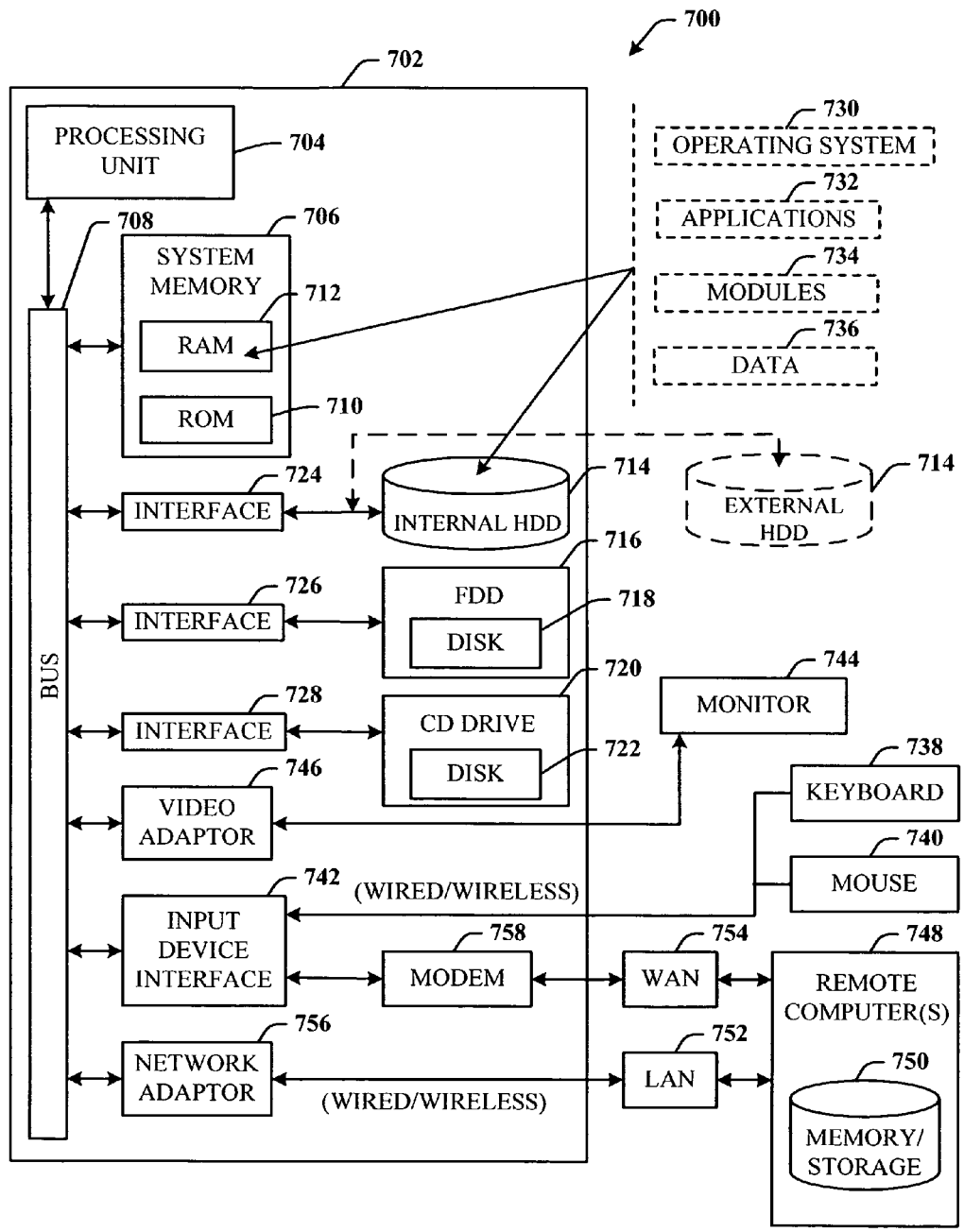
FIG. 7 illustrates a block diagram of a computer operable to execute the disclosed architecture.

Referring now to FIG. 7, there is illustrated a block diagram of a computer operable to execute the disclosed architecture. In order to provide additional context for various aspects of the present invention, FIG. 7 and the following discussion are intended to provide a brief, general description of a suitable computing environment 700 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, there is illustrated an exemplary environment 700 for implementing various aspects of the invention that includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 712, including an operating system 730, one or more application programs 732, other program modules 734 and program data 736. All or portions of the operating system, applications, modules, and/or data can also be cached in the RAM 712.

It is appreciated that the present invention can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices, and companies, and facilitate enterprise-wide computer networks, such as intranets, all of which may connect to a global communication network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756. When used in a WAN networking environment, the computer 702 can include a modem 758, or is connected to a communications server on the LAN, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10 Base T wired Ethernet networks used in many offices.

Figure 8:
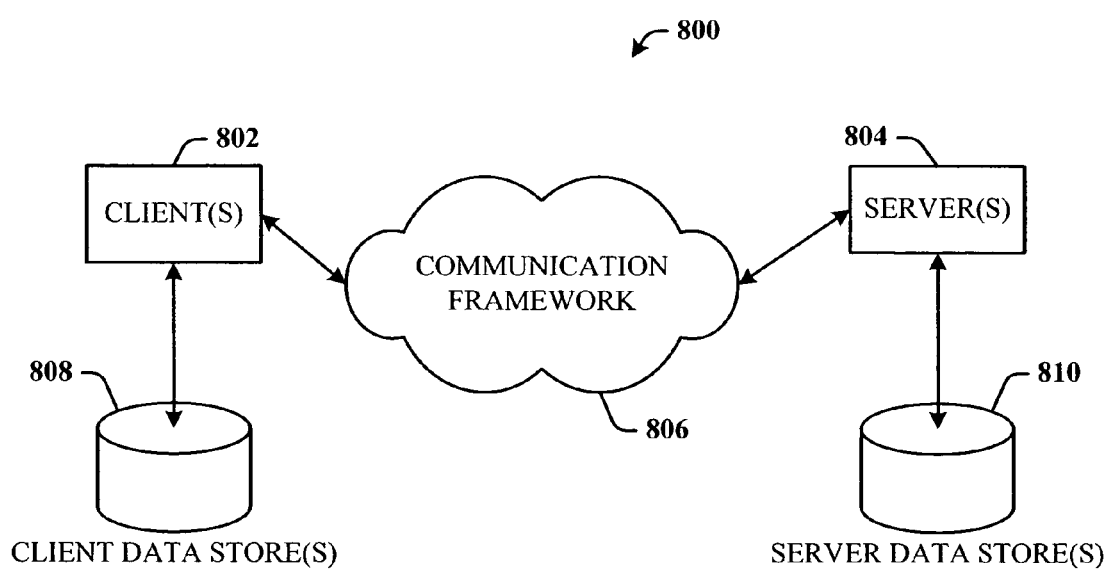
FIG. 8 illustrates a schematic block diagram of an exemplary computing environment in accordance with the present invention.

Referring now to FIG. 8, there is illustrated a schematic block diagram of an exemplary computing environment 800 in accordance with the present invention. The system 800 includes one or more client(s) 802. The client(s) 802 can be hardware and/or software (e.g., threads, processes, computing devices). The client(s) 802 can house cookie(s) and/or associated contextual information by employing the present invention, for example. The system 800 also includes one or more server(s) 804. The server(s) 804 can also be hardware and/or software (e.g., threads, processes, computing devices). The servers 804 can house threads to perform transformations by employing the present invention, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications cab be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates the generation of meaningful description for a flattened data structure, comprising:
    a data structure having a plurality of data nodes;
    a valuation component that assigns a valuation to one or more of the data nodes in accordance with a predetermined metric, the metric is at least one of time the node was accessed, that the node was modified, when the node was modified, that the node was copied, when the node was copied, an access frequency, or a number of unique users who have accessed the node; and
    a description component that generates a description that represents at least one of the one or more data nodes that is selected according to the metric, wherein a first set of meaningful names is generated for a first user and a second set of meaningful names is generated for a second user, the first and second sets of meaningful names are generated from the same data structure.

2. The system of claim 1, the data structure is hierarchical.

3. The system of claim 1, further comprising a selection component that selects which of the one or more data nodes is processed for viewing.

4. The system of claim 1, the metric is associated with observed user activity.

5. The system of claim 1, the selected data node is represented by the description, which description is a one-dimensional view.

6. The system of claim 1, the data structure is associated with at least one of an operating system and a data repository.

7. The system of claim 1, the selected data node is associated with a play list.

8. The system of claim 1, the valuation is presented as at least one of a number, image data, audio data, coloration, and a character string.

9. The system of claim 1, the one or more data nodes are at least one of local to a first computing system, located remote from the first computing system, and distributed across multiple computing systems.

10. The system of claim 1, the description can be used to navigate to the associated data node by hyperlinking the description to the corresponding data node.

11. The system of claim 1, the selected data node has the highest valuation.

12. A computer readable medium having stored thereon computer executable instructions for carrying out the system of claim 1.

13. A computer that employs the system of claim 1.

14. The system of claim 1, further comprising a classifier that facilitates automation of selected operations for the generation of the meaningful description by making an inference based on at least the metric associated with the one or more data nodes.

15. A computer implemented system that facilitates the generation of meaningful names for a data structure, comprising:
a hierarchical data structure having a plurality of data nodes;
a valuation component that assigns a valuation to one or more of the data nodes in accordance with one or more predetermined metrics based at least on observed activity, the metric is at least one of the time the node was accessed, that the node was modified, when the node was modified, that the node was copied, when the node was copied, an access frequency, or a number of unique users who have accessed the node;
a selection component that selects at least one of the one or more data nodes with the desired valuation; and
a naming component that generates one or more names that represent at least one of the data nodes that is selected according to the one or more predetermined metrics, wherein a first set of meaningful names is generated for a first user and a second set of meaningful names is generated for a second user, the first and second sets of meaningful names are generated from the same data structure.

16. The system of claim 15, the data node is represented by one or more meaningful names that are presented in a one-dimensional view.

17. The system of claim 15, the data structure is associated with at least one of an operating system and a data repository.

18. The system of claim 15, the valuation is presented as at least one of a number, image data, audio data, coloration, and a character string.

19. The system of claim 15, the selected data node is associated with a data path, which data path is defined by multiple data nodes each having one or more node designations, the one or more node designations are processed by the naming component to generate a one-dimensional representation of the selected node.

20. The system of claim 15, the naming component generates a plurality of flattened one-dimensional meaningful name outputs that correspond to multiple nodes that have been selected according to the assigned valuation.

21. The system of claim 15, the one or more names include metadata information representative of at least one of location data, relative time, recency, reoccurrence, and classification type.

22. A computer-readable medium having computer-executable instructions for performing a method of generating meaningful names of a data structure, the method comprising:
receiving a data structure having a plurality of nodes;
processing observed user activity associated with the plurality of nodes;
assigning a valuation to each of the plurality of nodes, the valuation is determined by at least one of time the node was accessed, that the node was modified, when the node was modified, that the node was copied, when the node was copied, an access frequency, or a number of unique users who have accessed the node;
selecting one or more of the plurality of nodes that is associated with a predetermined valuation limit;
extracting node metadata that is associated with the one or more selected nodes; and
generating a meaningful name for each of the one or more selected nodes based on the respective node metadata, wherein a first set of meaningful names is generated for a first user and a second set of meaningful names is generated for a second user, the first and second sets of meaningful names are generated from the same data structure.

23. The method of claim 22, further comprising outputting the meaningful name as a one-dimensional view.

24. The method of claim 22, the node metadata is in the format of at least one of a number, image data, audio data, a character string, and a word.

25. The method of claim 22, the data structure is a hierarchical data structure.

26. The method of claim 22, further comprising:
learning a new observed user activity associated with the plurality of nodes; and
assigning a new valuation for each of the plurality of nodes.

27. The method of claim 22, further comprising filtering out unimportant node metadata.

28. The method of claim 22, further comprising:
detecting a format of the node metadata; and
generating the meaningful name in at least one of the same format, a different format, and a combination of the same format and the different format.

29. The method of claim 22, the meaningful names are generated using at least one of a folder name and a file name that are associated with the each node of the plurality of nodes.

30. The method of claim 22, further comprising:
analyzing text of a document that is associated with the selected node; and
generating a meaningful name of that selected node based on a frequency that a word is used in the text of the document.

31. A computer implemented system that facilitates the generation of meaningful names for a data structure, comprising:
means for receiving a hierarchical data structure having a plurality of nodes;
means for processing observed user activity associated with the plurality of nodes;
means for assigning a valuation to each of the plurality of nodes, the valuation is determined by at least one of time the node was accessed, that the node was modified, when the node was modified, that the node was copied, when the node was copied, an access frequency, or a number of unique users who have accessed the node;
means for selecting one or more of the plurality of nodes that is associated with a predetermined valuation limit;
means for extracting node metadata that is associated with the one or more selected nodes; and
means for generating a meaningful name in the format of a one-dimensional view for each of the one or more selected nodes based on the respective node metadata, wherein a first set of meaningful names is generated for a first user and a second set of meaningful names is generated for a second user, the first and second sets of meaningful names are generated from the same data structure.

32. The system of claim 31, further comprising:
means for analyzing descriptors of one or more files and filenames that are associated with the selected node; and means for generating a meaningful name based on the descriptors associated with the files and filenames.

33. The system of claim 32, the descriptors are in the format of at least one of a number, image data, audio data, a character string, and a word.

34. The system of claim 31, further comprising:
means for learning a new observed user activity associated with the plurality of nodes;
means for updating the observed user activity with the new observed user activity; and
means for assigning a new valuation for each of the plurality of nodes based on the new observed user activity.

35. The system of claim 31, the meaningful name includes metadata information representative of at least one of location data, relative time, recency, reoccurrence, and classification type.

* * * * *